US006995768B2

(12) United States Patent
Jou et al.

(10) Patent No.: US 6,995,768 B2
(45) Date of Patent: Feb. 7, 2006

(54) INTERACTIVE BUSINESS DATA VISUALIZATION SYSTEM

(75) Inventors: Stephan F. Jou, Nepean (CA); Don Campbell, Kanata (CA); Ian Ballantyne, Osgoode (CA)

(73) Assignee: Cognos Incorporated, Ottawa (CA)

( * ) Notice: Subject to any disclaimer, the term of this patent is extended or adjusted under 35 U.S.C. 154(b) by 519 days.

(21) Appl. No.: 09/852,601

(22) Filed: May 10, 2001

(65) Prior Publication Data

US 2003/0071814 A1 Apr. 17, 2003

Related U.S. Application Data

(60) Provisional application No. 60/202,911, filed on May 10, 2000.

(51) Int. Cl.
*G06T 11/20* (2006.01)

(52) U.S. Cl. .................................................. 345/440
(58) Field of Classification Search ................. 345/419, 345/440, 440.1, 440.2, 441–443, 473, 589, 345/593, 594, 595; 707/100, 903
See application file for complete search history.

(56) References Cited

U.S. PATENT DOCUMENTS 5,450,535 A * 9/1995 North .......................... 395/140

2002/0070953 A1 * 6/2002 Barg et al. .................. 345/700

OTHER PUBLICATIONS

Thomas Chester and Richard Alden, Mastering Excel 97, 1997, Fourth Edition, pp. 379 and 451–454.*

* cited by examiner

Primary Examiner—Matthew C. Bella
Assistant Examiner—G. F. Cunningham
(74) Attorney, Agent, or Firm—Gardner Groff, P.C.

(57) ABSTRACT

An interactive system for visualizing business data organized according to the dimensional model allows to combine data from more than one data source and present the data in the form of a graphical, multi-metric data visualization. The visualizations are hierarchically structured and built from visualization elements including, in ascending order of hierarchy, charts, panels, scenes and sheets. The system provides a large variety of two- and three-dimensional visualization elements, mostly predefined charts, which can be combined in any number into fully customized visualizations. In a preferred embodiment, a visualization is built by the system, which prompts the user to select data sources, data items to be visualized, and certain features of the presentation layout. In response to the user input, the system generates a number of candidate visualizations and presents them to the user for selection in descending order of preference, based on numerical scores assigned to the candidate visualizations by a scoring algorithm. The data to be visualized can be filtered, drilled down for details, or presented in a series of consecutive visualizations, to create an animation effect.

12 Claims, 3 Drawing Sheets

INTERACTIVE BUSINESS DATA VISUALIZATION SYSTEM

CROSS REFERENCE TO RELATED APPLICATION

This document claims priority to and the benefit of the filing date of copending provisional application entitled INTERACTIVE BUSINESS DATA VISUALIZATION SYSTEM, assigned Ser. No. 60/202,911, and filed May 10, 2000, which is hereby incorporated by reference.

FIELD OF THE INVENTION

The present invention relates to a business data visualization system and method, more particularly to an interactive system and method of visualizing business data organized according to the dimensional model.

BACKGROUND OF THE INVENTION

The field of business applications of computer technology has seen many important changes over the last few years. With steadily growing computational power and data storage capacities of computer systems used for business data processing, the interest of the business community has shifted from transactional data management systems (on-line transaction processing systems, or OLTP systems, mostly supporting day-to-day business operations) and from relatively simple business data processing systems, towards sophisticated business management systems, such as enterprise resource planning (ERP) systems, integrating at the enterprise level all facets and functions of the business, including planning, manufacturing, sales and marketing. An example of a business management software package of this scope is SAP R/3 System available from SAP AG (Germany) or its U.S. branch, SAP America, Inc.

Among various alternative approaches to business data management and analysis developed over the last few years, many are related to data warehousing. A data warehouse can be defined broadly as a subject-oriented collection of business data identified with a particular period of time, as opposed to transactional databases dedicated to ongoing business activities. A scaled-down, usually single-subject oriented warehouse is sometimes referred to as a data mart. Data in a warehouse is normally gathered from a variety of sources (mostly various OLTP and legacy systems) and merged into a coherent whole. Data in a warehouse is usually stable, in that data is added to the warehouse but not removed. The latter feature, which is normally desirable to provide a more complete image of the business over time, may be absent from warehouses designed to keep data for a predetermined time span, with the oldest data being unloaded when the newest data is added.

As opposed to data stored in OLTP systems intended to support day-to-day operations and optimized for the speed and reliability of transaction updating, data stored in a data warehouse is intended to provide higher-level, aggregated views of the data, such as total sales by product line or region over a predetermined period of time, in support of business decision making. To provide consistently fast responses to such aggregate queries, data in a data warehouse or data mart must be structured in a manner facilitating the data synthesis, analysis, and consolidation.

The most characteristic feature of warehoused business data is its multidimensional view of a business, meaning that business data is organized according to major aspects and measures of the business, called dimensions, such as its products, markets, profits, or time periods involved, as opposed to data dependencies model of the business data, which keeps track of all logical relationships among all the possible data elements relevant to the business and its day-to-day operations. A dimension may include several hierarchical levels of categories, for example the market dimension may contain, in descending order, such categories as country, region, state, and city, each category having its own number of specific instances. A hierarchical dimension reduces the total number of dimensions necessary to describe and organize the data, as compared with the situation where each category is represented by a separate dimension. The action of viewing data in greater detail by moving down the hierarchy of categories, i.e, by moving from parent to child category, is sometimes referred to as "drilling down" through the data. Quite naturally, the action of moving in the opposite direction, i.e., up the hierarchy of categories, to produce a more consolidated, higher-level view of data, is known as "drilling up" through the data.

Data organized according to the dimensional model are frequently visualized as a multidimensional data cube (or simply cube), a matrix-type structure having dimensions and their corresponding categories extending along its edges, The volume of the cube is divided into cells, each cell corresponding to a combination of a specific instance of each dimension and containing a metric, such as a numerical value, corresponding to this combination. Such a structure has an obvious geometric representation and can be easily visualized only when the number of dimensions does not exceed three (and becomes a hypercube above this limit), but the term "cube" (or "multidimensional cube") is traditionally used for any number of dimensions. A source of business data organized according to the dimensional model is sometimes referred to as an OLAP source, from On-Line Analytical Processing, a term applied broadly to class of technologies designed for dimensionally-oriented, ad hoc data representation, access, and analysis.

The vast amounts of warehoused or otherwise collected business data would be useless without software tools for its analysis. Such tools are known under the collective name of Business Intelligence (BI) applications, an example of which is a suite of BI applications from Cognos Inc. (Canada). BI applications provide, among others, data warehouse construction tools, as well as database querying, navigation and exploration tools, the latter including, among others, reporting, modeling, and visualization tools. Some of these tools combine new ways of data analysis and presentation with methods for discovering hidden patterns and previously unrecognized relationships among data, the approach known as data mining.

Among BI applications made available to the business community over the last few years, tools for visualizing business data are of particular importance. By interacting with person's sight, they became means of choice for consolidating and presenting vast amounts of complex information, in the manner which facilitates pattern recognition in the presented data and invites data exploration. The present invention provides a new interactive system and method of data visualization, having many features lacking from prior art visualization tools.

SUMMARY OF THE INVENTION

According to one aspect, the present invention provides an interactive system for visualizing business data organized according to the dimensional model, which system comprises means for retrieving data from at least one dimensional data source, means for converting the retrieved data into a graphical form, and means for presenting the converted data to a user as a graphical visualization.

In a preferred embodiment the system of the present invention is computer-implemented and allows the user to combine data from more than one data source and present the data in the form of a graphical, multi-metric data visualizations.

Visualizations according to the invention are hierarchically structured and built from visualization elements including, in ascending order of hierarchy, charts, panels, scenes, and sheets. Any number of elements of a lower hierarchy level can be included in the visualization elements of the immediate higher hierarchy level.

A visualization according to the invention can be built in a number of manners, such as starting from a blank visualization and adding manually various visualization elements, in any order, or importing them from an existing visualization. According to a preferred embodiment, the visualization is built by the system, which prompts the user to select data sources, data items to be visualized, and certain features of the presentation layout. In response to the user input, the system generates a number of candidate visualizations and presents them to the user for selection in descending order of preference, based on numerical scores assigned to the candidate visualizations by a scoring algorithm.

The system of the invention provides the user with a large variety of predefined types of two- and three-dimensional charts, such as line, bar, surface, pie, swatch, and map charts, as well as two- and three-dimensional scenes, which can be combined, in any number, into fully customized visualizations. According to preferred embodiments of the invention, data are visualized with map charts and scorecards.

Data to be entered into a visualization may be filtered, to temporarily limit the visualization to specific categories or ranges, or to animate the data by showing its progression over time, or across any other parameter. This is achieved by adding appropriate filters to the visualization, which filters can be turned on and off, as required.

Other advantages, objects and features of the present invention will be readily apparent to those skilled in the art from the following detailed description of preferred embodiments in conjunction with the accompanying drawings and claims.

BRIEF DESCRIPTION OF THE DRAWINGS

The invention will now be described with reference to its preferred embodiments and the accompanying drawings, in which.

DETAILED DESCRIPTION OF THE PREFERRED EMBODIMENTS

As used herein, the term "visualization" is understood broadly as a graphical, multimetric, and interactive presentation of business data, consolidating in a limited space a large amount of complex business information and summarizing it by a number of metrics presented to the user in a highly visual form. The term "metric" (noun) is understood as any quantitative (numerical) measure or qualitative (non-numerical) characteristic calculated or otherwise obtained from business data, which measure or characteristic provides a summary of some aspects of business activities or performances. Metrics are usually numerical and aggregate (formed by adding or combining) business data representations and may combine data or information from more than one data source. An "interactive visualization" is understood as a visualization involving the user in the process of creating the visualization and in the data exploration using the visualization so created. The term "measure" is understood as a quantifiable, numerical performance indicator, such as revenue, revenue per employee, or profit margin percentage, which is normally used to determine how well is a business operating. "Data item" is understood as a textual or numerical component of a chart or filter, which is either a dimension, a measure, a column (text or numerical) in a flat file, or a category within a dimension. "Category" is a level of detail within a dimension or data item (except for numbers or measures).

Figure 1:
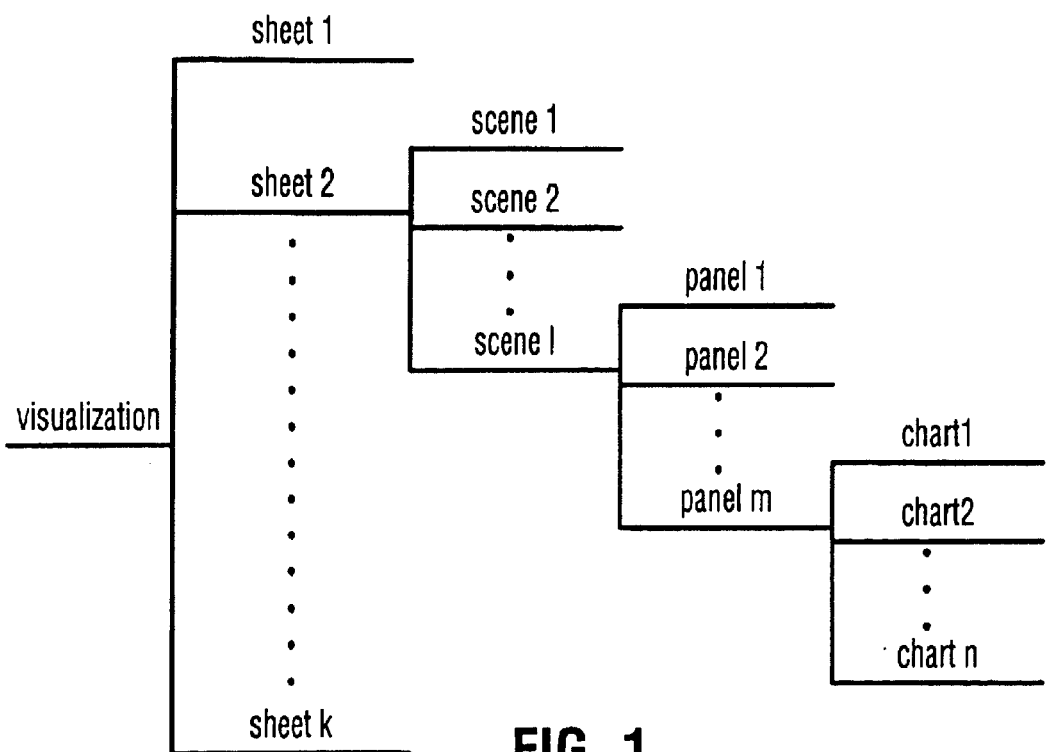
FIG. 1 is a diagram showing schematically the hierarchical structure of the visualization according to the invention.

A visualization according to the invention is preferably structured hierarchically, using visualization elements including, in the descending order, sheets, scenes, panels, and charts. The hierarchy of visualization elements means that a chart is a component of a panel, the panel is a component of a scene, the scene is a component of a sheet, and the sheet is a component of a visualization. The hierarchical structure of a visualization according to the invention is shown schematically in FIG. 1. The visualization shown diagramatically in FIG. 1 consists of k sheets (sheets 1 through k). Of those, the second sheet (sheet 2) consists of l scenes (scenes 1 through l). The lth sheet (sheet l) contains m panels (panels 1 through m), of which the mth panel (panel m) includes n charts (charts 1 through n). To avoid overcrowding, FIG. 1 shows visualization elements of an immediate lower level of hierarchy only for one visualization element of the immediate higher level of hierarchy. It is obvious, however, that this tree-like structure extends to each visualization element of each level of hierarchy above the level of chart. There are no limits and rules to follow when choosing the number of visualization elements of a given level of hierarchy when creating a visualization. In an extreme case, the visualization may even consist of a single chart (k=l=m=n=1 in the diagram of FIG. 1).

In the visualization according to the invention, sheets, scenes and panels are normally used to group related information, which is presented in the form of charts. A new sheet, scene, or panel is typically added to the visualization when there is a thematic change, for example from sales to marketing, when the existing visualization elements contain too much information, or a reference is made to a new data source. There is no limit to the number of visualization elements which may be included in any given level of hierarchy, other than resources of the computer system used for creating and viewing the visualization. In particular, a visualization may contain any number of sheets, a sheet any number of scenes, a scene any number of panels, and a panel any number of valid chart combinations. In practice, however, the number of visualization elements at any given level of hierarchy is limited by the visualization space offered by visualization elements of the immediate and higher levels and by other possible design considerations. For example, the space offered by a sheet may be limited by design to the area of the display device, such as the monitor screen, to avoid scrolling. This automatically affects the number of visualization elements entered at each of the lower levels of hierarchy, to avoid the screen space becoming overcrowded with scenes and panels, or graphs becoming too small and illegible. Increasing the number of sheets to increase the amount of the available visualization space may not always be a solution, as this may result in the visualization loosing its focus.

The method and the system of the invention provides the user with choice of two- and three-dimensional panels and a large variety of two- and three dimensional charts, which can be combined into multi-metric, fully customized visualizations. These visualizations may include data from more than one data source and combine both two- and three-dimensional panels in one scene, similarly as two- and three-dimensional charts in one panel.

Chart, the basic (lowest hierarchy level) visualization element, is at the same time the most important single element responsible for summarizing the data and conveying its meaning to the user. Charts are used, for example, to show comparisons, trends, and relationships between data items, Charts are placed on panels and all charts on the same panel must reference to the same data source and have a common axis. Any charts within the same sheet using the same textual data item on an axis may have these axes synchronized, meaning that any changes to one axis result in the remaining axes being concurrently updated.

The method and the system of the invention provide a large variety of predefined types of charts to be used for visualization purposes, including, but not limited to, scatter plot charts, line charts, bar (single, stacked, or clustered) charts, pie charts, surface charts, swatch charts, value charts, gauge charts, table charts, crosstab charts, matrix charts and map charts (maps). Most of these charts may be either two- or three dimensional. Some, such as surface charts, are always three-dimensional.

Charts can be combined, manipulated, and enhanced in a number of manners, to increase their informative value and visual appeal. For example, charts of either the same or different types can be combined in a single panel, to create multi-metric, comparison, or correlation charts. Such combinations include, for example, a multi-line chart (combination of several line charts), a multi-surface chart (combination of several surface charts), combination of several scatter plots (either two- or three-dimensional), a combination of a two-dimensional bar chart with a two-dimensional line chart, a combination of a three-dimensional bar chart with a three-dimensional surface chart, etc. Data values can be represented as numbers on a panel, to provide information in a non-graphical format (a value chart). Such numerical values (value charts) can be combined with other chart types, for example the swatch chart, to reinforce their informative value. In some types of charts, numeric data ranges may be mapped to colors or multiple axes may be used to analyze several data items at a time (a parallel coordinate chart). These and some other options available to the user will be discussed later in more detail.

Color can be used in charts and in backgrounds of panels and scenes to enhance their informative value and visual appeal. In many chart types, such as multi-line and cluster bar charts, color can be used to represent grouped data items. In pie charts, colors are used to differentiate between various sectors of the chart. Colors may also be used to highlight ranges of data and exceptions. These colors, which can be changed at any time in the process of creating a visualization, belong to a color palette, understood as a set of colors on a scale. A color palette can be either continuous (gradient), with colors blending into each other along a chromatic scale, or discrete (non-gradient), with colors distinctly divided along a chromatic scale. The method and system of the invention provides several default color palettes of both kinds. These palettes may be modified by the user and new palettes may be created. Color palettes may also be imported from existing visualizations.

The choice of chart to visualize data depends mostly on the nature of data to be charted and the information that the chart is intended to communicate. This is why it is usually advisable to define first the purpose of the visualization, then to select the most effective chart to illustrate it. For example, when the purpose is to show the change over time for one variable, the bar or line chart is usually the best choice. Tracking data over time, comparing trends and cycles or showing a time series analysis is usually best visualized by using the line or multi-line chart. The three-dimensional bar chart is usually used to compare the relationship between two data items, whereas comparing relationships between several data items may be best visualized by the surface or multi-line chart. Comparing parts of a whole as a percentage or groups of information over time is normally best visualized by the stacked bar chart, whereas comparing groups of related information requires the use of the clustered bar chart. The pie chart is usually used to represent the parts of a whole. Creating a scorecard of key performance indicators is best achieved using the parallel coordinate chart or swatch chart, the latter usually in combination with the value chart. The parallel coordinate chart is also used to compare or normalize data using multiple axis ranges. Correlation between various data items may be shown by the scatter plot chart, the multi-line chart, the bar and line chart, or the multi-surface chart. Geographically aggregated data is best visualized using a map (map chart).

The panel, a visualization element one level above the chart in the visualization hierarchy, is a flat, usually rectangular and framed surface, used as an immediate holder of a chart or charts. A panel contains information from only one data source, but may contain multiple charts referencing that data source. Similarly, more than one panel in a visualization may refer to the same data source. Depending on its position in a scene, a panel may be either vertical or horizontal. After being inserted into a scene, panels may be moved (repositioned) and/or resized, and labels, background images, and/or colors may be added thereto, to increase their informative value and visual appeal.

The scene, a visualization element one level above the panel in the visualization hierarchy, has no well-defined limits and can be seen as two- or three-dimensional window (visualization space) that holds a panel or a group of panels. Usually a scene contain panels and charts that are thematically linked, such as charts for the revenue, profit margins, and costs for one department. Multiple scenes can be put on one sheet.

The sheet is a page in a visualization file, similar in nature to sheets in a spreadsheet file, and usually combines several thematically related scenes. New sheets are added to the visualization to increase the amount of the visualization space and/or to separate various aspects of the common visualization theme.

In a preferred embodiments, the visualization system and method according to the invention is implemented in the form of an application running under an operating system, preferably under the MS Windows operating system, using facilities and methodologies of the Windows environment well known to those skilled in the art, such as the point-and-click graphical user interface, as well as standard input and output devices, such as a mouse and a keyboard. The computer running the application is normally linked to a computer network, to facilitate access to sources of the visualized data, which data may be stored on a remote computer (server) connected to the same network. The application is used to create new and to edit existing visualizations, which may be then distributed over the network for viewing by the end users (consumers), using either the same application or other suitable software. In a preferred embodiment, the visualizations are distributed by a server as HTML files over a TCP/IP network, preferably an intranet or the Internet, and are viewed using a client software and a Web browser.

In the method and system according to the invention, the informative value of a visualization may be enhanced in a number of manners, for example by annotating the visualization with suitable explanatory notes. Such notes can be entered, for example, as textual labels added to a panel having charts on it or as a standalone text entered into a panel. Explanatory notes can also be added to sheets, scenes, and panels, for example to explain the nature of the visualized data or changes made to the visualization, such as adding a filter or double-click actions. These explanatory notes are preferably entered into a special window (Explain Window) available for sheets, scenes, and panels in a visualization. In a preferred embodiment, the same window may be used for charts to look up the exact numerical value on a chart or map. For example, clicking a surface or a line chart at a point other than marked with a marker (a symbol indicating the position of a data point on a chart) displays in the Explain Window data details for the points that make up the entire surface or line. For charts where the information is color-coded, a legend explaining the coding may be added, preferably as a separate window, which may be minimized to an icon when obstructing the view or no longer needed.

Figure 2A:
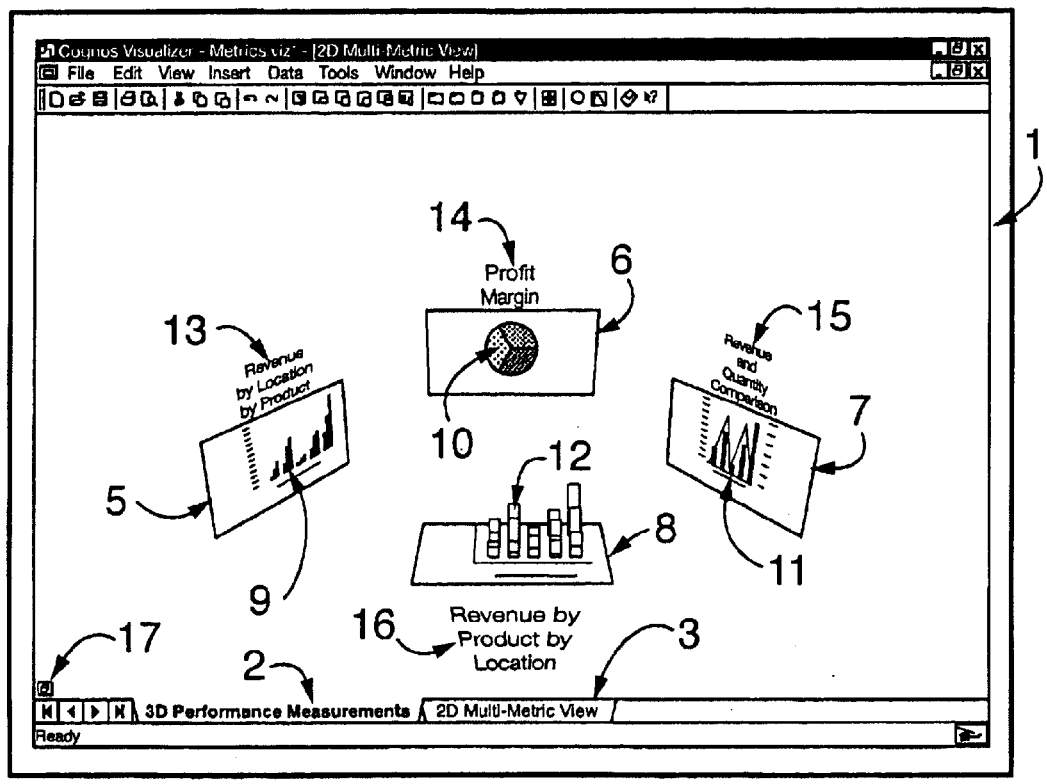
FIG. 2A is a screenshot showing the first sheet of an exemplary two-sheet business data visualization according to the invention.
Figure 2B:
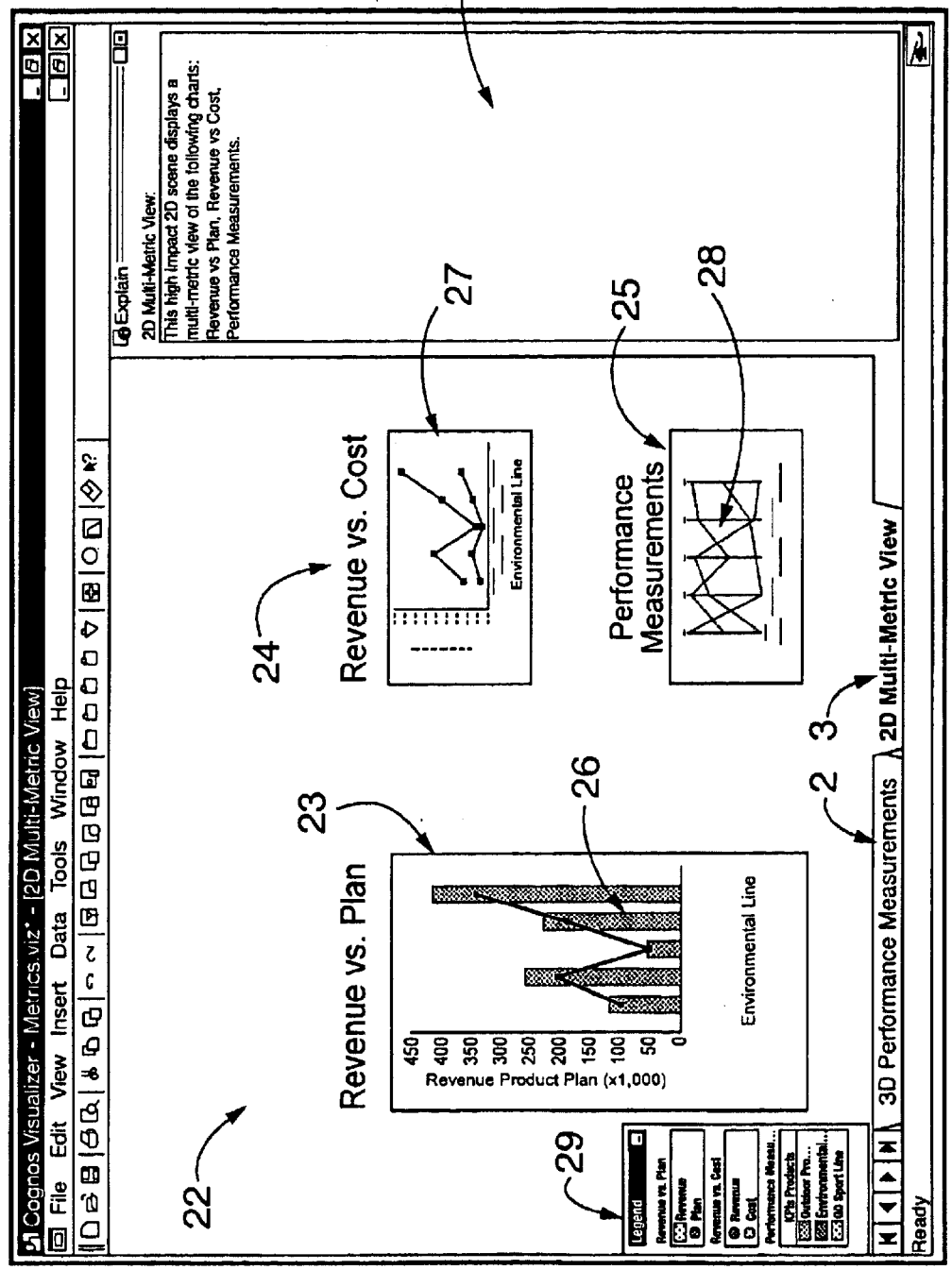
FIG. 2B is a screenshot showing the second sheet of the visualization of FIG. 2A.

FIGS. 2A and 2B provide an example of a two-sheet visualization according to a preferred embodiment of the invention. FIG. 2A shows the first sheet (1) of the visualization. Sheet I is identified by its title appearing on a tab 2 at the bottom of the screen. A tab 3 identifies the second (invisible in the background) sheet of the visualization. This sheet can be brought to the foreground by clicking at tab 3, which action hides sheet 1 in the background. Sheet 1 contains only one three-dimensional scene 4 composed of three vertical panels 5, 6, and 7 and a horizontal panel 8. Each panel holds a single chart (9, 10, 11, and 12, respectively), which charts show various aggregated business performance characteristics, identified by labels 13, 14, 15, and 16 associated with panels 5, 6, 7, and 8, respectively. Of the charts shown in FIG. 2A, chart 9 is a two-dimensional clustered bar chart, chart 10 is a two-dimensional pie chart, chart 11 is a two-dimensional bar chart combined with a two-dimensional line chart, and chart 12 is a three-dimensional bar chart. An icon 17 in the lower left-hand corner of sheet 1 is a minimized legend window, explaining the color-coding scheme of the graphs.

FIG. 2B shows the second sheet (21) of the visualization, which sheet was hidden behind sheet 1 in FIG. 2A. Sheet 21 is now the foreground sheet, identified by tab 3. Tab 2 identifies sheet 1 (shown in FIG. 2A), now invisible (hidden behind sheet 13). As previously, the background sheet 1 can be brought to the foreground by clicking at tab 2, which action hides sheet 21 behind sheet 1. Sheet 21 contains only one two-dimensional scene 22 composed of three panels 23, 24, and 25, each holding a single chart 26, 27, and 28, respectively. Charts appearing in FIG. 2B are a two-dimensional bar chart combined with a line chart (chart 26), a multi-line chart 27 and a parallel coordinate chart 28. Window 29 is a legend window explaining the scheme of color-coding used for the charts. Window 30 is an Explain Window, showing either explanatory notes relating to the sheet, scene, or panel or data details for a chart. The notes for a given visualization element can be viewed, entered, or edited by selecting (clicking at) the visualization element of interest. Data details for charts can only be viewed.

In the method and system according to the invention, data to be included in a visualization may be filtered, i.e., limited to a subset of data available from a given source. Filtering may be necessary, for example, to focus the visualization on aspects of the business which are of interest. For example, instead of looking at total sales, viewing sales for a specific region, product line, or time segment may be preferable. In some cases, trends and patterns may be more evident when limiting the amount of data included in the visualization. In particular, it may happen that most of the relevant data is within a particular range, so it may be desirable to highlight or narrow in on that range. Sometimes it may be desirable to animate some of the data in a sequence, to highlight a chronological or geographic pattern. The method and system according to the invention provides several types of pre-defined filters which serve the above stated purposes, including, but not limited to, check filter, radio filter, range filter, and animation filter.

The check filter provides a selection of categories (data items) from the data source. For example, for a chart showing profit margin versus products, it may be desirable to chart the results for some locations but not others. This is achieved by inserting a check filter associated with the chart, choosing location as the data item and selecting the required locations. Multiple data items may be selected at different levels of the data source, except for parent and child categories of the same dimension, and do not have to be contiguous.

The radio filter includes only one category from the selected data item. For example, for a chart showing sales versus product, it may be desirable to show the results for one location at a time. This is achieved by inserting a radio filter associated with the chart, choosing location as the data item and selecting the location category to show.

The range filter includes or excludes a specified contiguous range of numeric or textual data in a data source. For example, for a chart showing sales revenue versus product line it may be desirable to see revenue only for products that have a profit margin of 20 percent or more. This can be achieved by inserting a range filter associated with the chart and specify the range for profit margin, to filter out profit margin data below 20 percent.

The animation filter is used to show the progression of data over time, across geographic locations, or across any other non-numerical item in the data source. For example, for a three-dimensional bar chart showing sales by product and by department, it may be desirable to animate the sales in a month-by-month sequence for a given year. This can be achieved by inserting an animation filter associated with the chart and apply filter settings that will show the chart for the consecutive months of the year, with the animation speed controlled by the user. The animation filter is normally a tool of choice for spotting trends and anomalies in the data.

A filter can be associated with only one data source, but can be associated with any number of chart, panels, or scenes, as long as they are on the same sheet. Similarly, several filters may be applied to a visualization element and can be turned on and off, as required. Filters can be inserted and their parameters set manually, preferably by a wizard-type series of dialog boxes, or imported from another visualization. It is usually more efficient and therefore preferable to reuse an existing filter than to re-create it. When a filter is inserted, it is automatically associated with all charts on the sheet which use the same data source. As new charts are added, they are by default associated with the filters that are applied to the same data source. Associations which are not required may be explicitly removed.

The visualization method and system according to the invention also allow drilling on the dimension axis of charts, by moving either up or down the hierarchy of categories of a dimension (drilling up and drilling down, respectively), to obtain a more (down) or less (up) detailed view of the data. In a preferred embodiment, this is achieved by double-clicking an axis label, with the direction of the drilling indicated by the form of the cursor.

A visualization according to the invention can be created in a number of manners, for example by modifying an existing visualization, or by starting with a blank visualization and inserting the visualization elements, either manually or by importing them from an existing visualization. When starting with a blank visualization, it is also possible to use the Visualization Wizard to create candidate visualization elements and insert the selected one. The use of the Visualization Wizard will for creating a visualization will be discussed later in more detail. When building a visualization manually, visualization elements may be inserted in any order, for example starting from a sheet and inserting other elements afterwards, or starting from a chart and adding higher level elements (panels, scenes, and sheets) later on.

According to a preferred embodiment of the invention, a visualization is created using the Visualization Wizard. The Wizard guides the user through the steps of creating the visualization, by prompting the user to select the data sources and certain layout features. The user input is preferably gathered through a wizard-type series of dialog boxes presented to the user. Based on the user input, the Wizard generates a number of candidate visualizations, which are then presented to the user for selection in descending order of preference. The Wizard's guidance in creating a visualization can be obtained regardless of the starting visualization element, i.e., whether a sheet, scene, panel, or chart. When previewing the candidate visualizations, the user can go back to various dialog boxes presented earlier to the user, to change the selection of data item and their order. This results in the candidate visualizations being updated correspondingly and may changed their order of preference.

The process of the user making selections in response to Wizard's prompts results in the creation of a single visualization request. The request describes what the user wants to visualize and, at least in part, how he wants to do it, in terms of data items selected from one or more data sources, the grouping of data items, and the requested visualization elements (sheets, scenes, panels, and charts). Based on the request, the Wizard generates a list of candidate visualizations, each of which uses up all the requested data items and obeys all the restrictions imposed by the user. Prior to presenting the list to the user, the visualizing quality of all the candidate visualizations is numerically evaluated by a scoring algorithm, which associates with each visualization a score number from a predetermined range, for example between 0 and 100. The score number, which attempts to assess numerically how well a given candidate visualization visualizes the request, is a combination of chart scores (individual scores assigned to each chart within the candidate visualization, providing a measure of how well a particular chart visualizes the data items assigned to it) and penalties, which are heuristics penalizing unused panels, inappropriately assigned data items, etc. The list of candidate visualizations is then arranged in descending order of the assigned scores and presented to the user for selection. To reduce the user's attention to only relative meaningfulness of the numerical score, the latter is preferably presented to the user in the form of some symbolic rating score, such as the five-star rating score (from zero to five stars, in half-star increments).

In a preferred embodiment of the invention, business data are visualized using a map chart (or simply a map). This kind of chart is naturally suitable for visualizing geographically distributed or aggregated data, for example by country, state/province, city, etc. There is no limitation on the maps used in the method and system of the invention other than that must be in the format supported by the system. Maps supported by the system are layer-organized, each layer containing a predetermined component of the map, such as country boundaries, state boundaries, city symbols, etc. By stacking the component layers, a complete map including the required components may be built. Additionally to sample maps provided with the system, maps may be either purchased from a third party or created using a suitable mapping software.

Map layers can be customized and the area view of the map can be changed to control the map appearance. In particular, the user can obtain a closer area view of a map or layer (zooming in), obtain a wider area view of a map or layer (zooming out), reposition a map within its window, set the view to a specific X and Y coordinates on a map, and set the view to a specific layer in a map.

According to a preferred embodiment of the invention, data visualized by a map are color-coded, by coloring each country, state, city, etc. in accordance with values of some quantitative or qualitative measure or characteristic assigned to that country, state, or city, using a predetermined color palette for converting the numerical or non-numerical values into corresponding colors. Even though a continuous (gradient) palette can provide any arbitrary number of colors for coloring the map, using a large number of colors for data coding may not always help the user to recognize patterns and relationships in the geographically presented data. It is therefore preferred to use for color-coding of maps a discrete (non-gradient) color palette with a limited number of colors. These colors can be assigned, for example, to some qualitative descriptors, such as bad, good, excellent, or low, normal, high, etc., which are easily understandable to the user. For a numerical data or characteristic changing continuously in a range of values, the reduction of the number of colors may be achieved by assigning predetermined colors of the discrete palette to predefined intervals of the range. Such intervals may be defined, for example, to meet certain qualitative, non-numerical criteria, for example below the plan, meeting the plan, and exceeding the plan. It is further preferred to color-code relative rather than absolute values, for examples percentages of certain reference value or values. In the system of the invention, the transformation of absolute into relative values can be achieved automatically, by including an appropriate filter.

The map charts according to the invention can be drilled up and down similarly as other kind of charts, to provide the user either with more aggregated or more specific data on a geographical region of interest. Drilling on a map chart not only changes the visualized data (in a manner similar to drilling on other kinds of charts), but may also change the map which is actually displayed. For example, if the original map presented to the user was a world map having revenue as the measure associated with various countries of the world, the user may wish to drill the map down to a specific country, such as the United States, to see the revenue associated with each state separately. If such a drilling is carried out by the user, a map of the United States showing the revenue associated with each state will be displayed.

According to a preferred embodiment of the invention, business data are visualized by a scorecard. This form of visualization is usually used for visualizing together a number of performance indicators. These may be, for example, key performance indicators of a business, to provide a condensed and comprehensive view of the business to the business management, or performance indicators of a product, to see how the product performs across a series of metrics. A scorecard is preferably created using a parallel coordinate chart or a combination of swatch and value chart. Examples of such scorecards are shown in FIG. 3.

Figure 3:
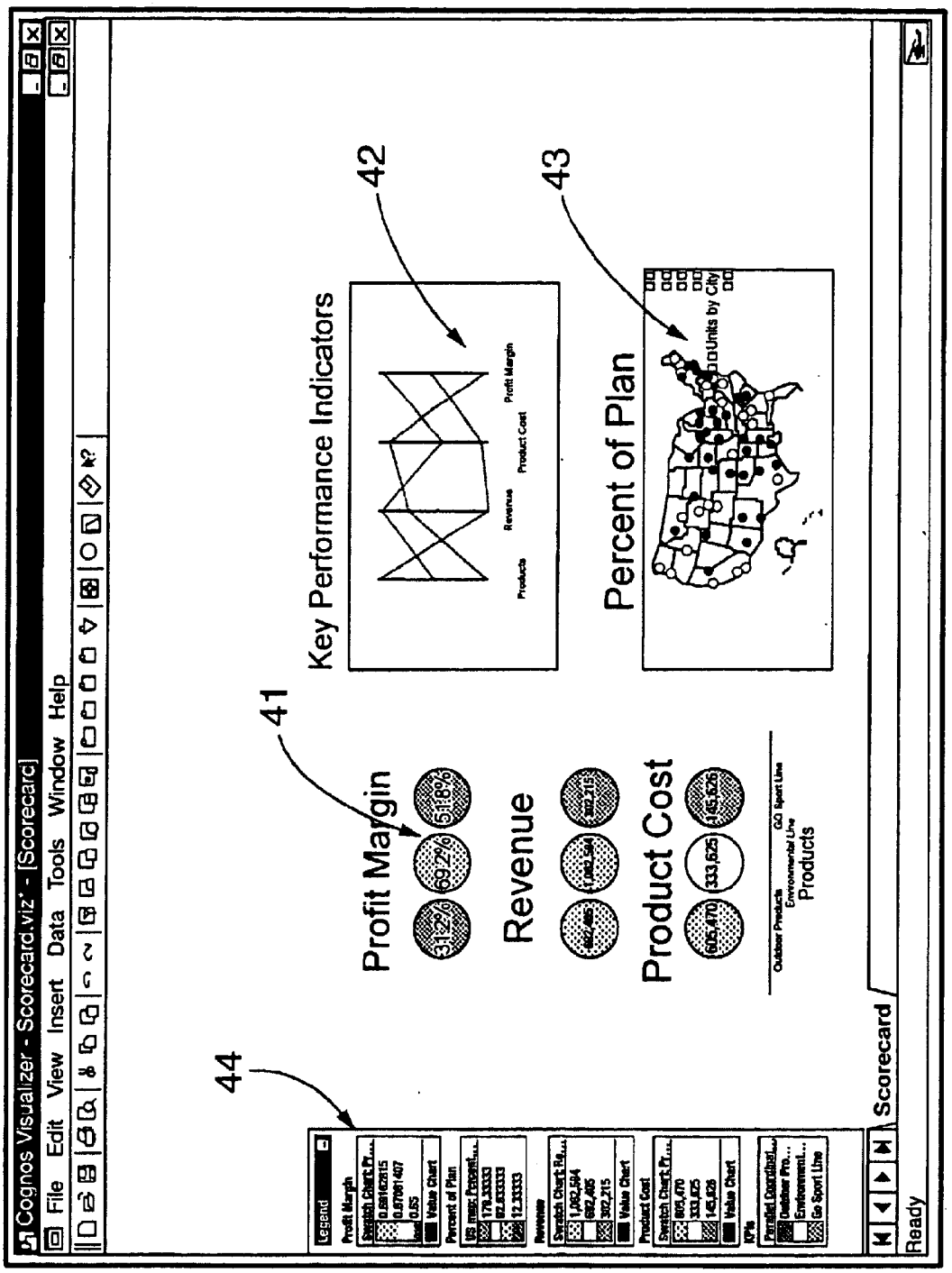
FIG. 3 is a screenshot illustrating an exemplary business data visualization using scorecards and a map chart.

In FIG. 3, a matrix swatch chart 41 (shaded circles) is used to summarize key performance indicators (profit margin, revenue, and product cost, corresponding to rows of the matrix) for three different lines of products (outdoor products, environmental line of products, and GO sport line of products, corresponding to columns of the matrix). In the original display, the swatch chart is color-coded using three discrete color palettes of three colors each, mapping predetermined numerical ranges of performance indicators to specific colors. The colors of each palette, but not the corresponding numerical ranges, are the same and may be linked to qualitative, non-numerical characteristics, such as bad, good, and exceptional. This coding allows to make a quick distinction between good and bad performances of various products. A value chart is layered on top of the swatch chart, to show specific values for each product and each indicator, thus adding an additional level of numerical detail to qualitative information provided by the color coding.

A parallel coordinate chart 42 in FIG. 3 shows essentially the same information as the matrix swatch chart 41 but in a different manner. In the parallel coordinate chart 42, the first axis is a product line axis, whereas the remaining axes represent the key performance indicators. The scale of each axis is adjusted to fit the length of the axis, which length is the same for all axes (normalized). Each line plot in the chart represents one product line, starting at the leftmost axis at a point corresponding to the given product line and continuing through points on the following, parallel and equally spaced axes, which points correspond to the value of a given indicator for the product line. In the original display, product lines are color-coded, meaning that each line plot is of a different color corresponding to the color coding for that product line.

A map chart 43 in FIG. 3 show percentage of the planned number of units of a product sold in major US cities. The map show boundaries of the country and its states, with cities represented by circular spots. In the original display, these spots are color-coded using a continuous palette, with colors representing the percentage of plan for a given city. The color palettes for all the charts appearing in the sheet are shown in a legend window 44.

While the present invention has been described in connection with what is presently considered to be the most practical and preferred embodiments, it is to be understood that the invention is not limited to the disclosed embodiments, but is intended to cover various modifications and equivalent arrangements included within the spirit and the scope of the appended claims.

What is claimed is:

1. An interactive system for visualizing business data organized according to a dimensional model, said system comprising:
   a. means for retrieving data from at least one dimensional data source;
   b. means for converting said retrieved data into a graphical form;
   c. means for presenting said converted data to a user as a hierarchically organized graphical multi-metric visualization combining data from more than one data source, said hierarchy of visualization elements including, in descending order, sheets, scenes, panels, and charts, said chart being a component of said panel, said panel being a component of said scene, said scene being a component of said sheet said sheet being a component of said visualization; and
   d. means for prompting a user to select data and layout features,
   said converting means generating a number of candidate visualizations based on said selected data and said selected layout features, and numerically evaluating said candidate visualizations for their visualizing quality using a scoring algorithm, wherein said scoring algorithm includes heuristic rules,
   said presenting means presenting said candidate visualizations to a user for selection in a ranked order based on numerical values scored.

2. A system according to claim 1, wherein the values scored are presented to a user as a relative rating.

3. A system according to claim 2, wherein said relative rating is a five star rating.

4. An interactive system for visualizing business data organized according to a dimensional model, said system comprising:
   a. means for retrieving data from at least one dimensional data source;
   b. means for converting said retrieved data into a graphical form; and
   c. means for presenting said converted data to a user as a hierarchically organized graphical multi-metric visualization combining data from more than one data source, said hierarchy of visualization elements including, in descending order, sheets, scenes, panels, and charts, said chart being a component of said panel, said panel being a component of said scene, said scene being a component of said sheet, said sheet being a component of said visualization,
   wherein said visualization comprises at least one visualization element, said visualization element is a two- or three-dimensional map, said map has data linked thereto, and said linked data are color-coded, using a discrete color palette defined by a user.

5. An interactive system for visualizing business data organized according to a dimensional model, said system comprising:
   a. means for retrieving data from at least one dimensional data source;
   b. means for converting said retrieved data into a graphical form; and
   c. means for presenting said converted data to a user as a hierarchically organized graphical multi-metric visualization combining data from more than one data source, said hierarchy of visualization elements including, in descending order, sheets, scenes, panels, and charts, said chart being a component of said panel, said panel being a component of said scene, said scene being a component of said sheet, said sheet being a component of said visualization, wherein said visualization comprises at least one visualization element, and said visualization element is a scorecard created using a two- or three-dimensional parallel coordinate chart or a swatch chart.

6. An interactive system for visualizing business data organized according to a dimensional model, said system comprising:
   a. means for retrieving data from at least one dimensional data source;
   b. means for converting said retrieved data into a graphical form;
   c. means for presenting said converted data to a user as a hierarchically organized graphical multi-metric visualization combining data from more than one data source, said hierarchy of visualization elements including, in descending order, sheets, scenes, panels, and charts, said chart being a component of said panel, said panel being a component of said scene, said scene being a component of said sheet said sheet being a component of said visualization; and
   d. a filter being added to said visualization for filtering said data, said filter being selected from the group consisting of a check filter, a radio filter, a range filter, and an animation filter,
   wherein said visualization comprises at least one visualization element, and said visualization element is a two- or three-dimensional map having color-coded data linked thereto and wherein said data are coded using a discrete color palette.

7. A method of visualizing business data organized according to a dimensional model, said method comprising the steps of:
   a. retrieving data from at least one dimensional data source;
   b. converting said retrieved data into a graphical form;
   c. presenting said converted data to a user as a hierarchically organized graphical multi-metric visualization combining data from more than one data source, said hierarchy of visualization elements including, in descending order, sheets, scenes, panels, and charts, said chart being a component of said panel, said panel being a component of said scene, said scene being a component of said sheet, said sheet being a component of said visualization; and
   d. prompting a user to select data and layout features,
   said converting step generating a number of candidate visualizations based on said selected data and said selected layout features, and numerically evaluating said candidate visualizations for their visualizing quality using a scoring algorithm, wherein said scoring algorithm includes heuristic rules,
   said presenting step presenting said candidate visualizations to a user for selection in a ranked order based on numerical values scored.

8. A method according to claim 7, wherein said values scored are presented to a user as a relative rating.

9. A method according to claim 8, wherein said relative rating is a five star rating.

10. A method of visualizing business data organized according to a dimensional model, said method comprising the steps of:
   a. retrieving data from at least one dimensional data source;
   b. converting said retrieved data into a graphical form; and
   c. presenting said converted data to a user as a hierarchically organized graphical multi-metric visualization combining data from more than one data source, said hierarchy of visualization elements including, in descending order, sheets, scenes, panels, and charts, said chart being a component of said panel, said panel being a component of said scene, said scene being a component of said sheet, said sheet being a component of said visualization,
   wherein said visualization comprises at least one visualization element, said visualization element is a two- or three-dimensional map, said map has data linked thereto, and said linked data are color-coded, using a discrete color palette defined by a user.

11. A method of visualizing business data organized according to a dimensional model, said method comprising the steps of:
   a. retrieving data from at least one dimensional data source;
   b. converting said retrieved data into a graphical form; and
   c. presenting said converted data to a user as a hierarchically organized graphical multi-metric visualization combining data from more than one data source, said hierarchy of visualization elements including, in descending order, sheets, scenes, panels, and charts, said chart being a component of said panel, said panel being a component of said scene, said scene being a component of said sheet, said sheet being a component of said visualization,
   wherein said visualization comprises at least one visualization element, and said visualization element is a scorecard created using a two- or three-dimensional parallel coordinate chart or a swatch chart.

12. A method of visualizing business data organized according to a dimensional model, said method comprising the steps of:
   a. retrieving data from at least one dimensional data source;
   b. converting said retrieved data into a graphical form;
   c. presenting said converted data to a user as a hierarchically organized graphical multi-metric visualization combining data from more than one data source, said hierarchy of visualization elements including, in descending order, sheets, scenes, panels, and charts, said chart being a component of said panel, said panel being a component of said scene, said scene being a component of said sheet, said sheet being a component of said visualization; and
   d. providing a filter to said visualization for filtering said data, said filter being selected from the group consisting of a check filter, a radio filter, a range filter, and an animation filter,
   wherein said visualization comprises at least one visualization element, and said visualization element is a two- or three-dimensional map having color-coded data linked thereto and wherein said data are coded using a discrete color palette.

* * * * *